Klett

[11] B 3,914,392
[45] Oct. 21, 1975

[54] HIGH TEMPERATURE INSULATING CARBONACEOUS MATERIAL

[75] Inventor: Robert D. Klett, Albuquerque, N. Mex.

[73] Assignee: The United States of America as represented by the United States Energy Research and Development Administration, Washington, D.C.

[22] Filed: Mar. 27, 1973

[21] Appl. No.: 345,422

[44] Published under the Trial Voluntary Protest Program on January 28, 1975 as document no. B 345,422.

[52] U.S. Cl. .................. 423/445; 201/25; 252/62; 264/29; 423/448; 423/449
[51] Int. Cl.² .................. C01B 31/02; C01B 31/04
[58] Field of Search ...... 423/445, 448, 449; 264/29; 201/6, 25, 29; 252/421, 62; 44/10 C

[56] References Cited
UNITED STATES PATENTS

| | | | |
|---|---|---|---|
| 982,950 | 1/1911 | Grunzweig | 201/25 |
| 1,369,428 | 2/1921 | Hawley | 201/6 |
| 2,650,190 | 8/1953 | Steinschlaeger | 201/25 X |
| 3,302,999 | 2/1967 | Mitchell | 423/448 |
| 3,387,940 | 6/1968 | McHenry et al. | 423/448 |
| 3,574,548 | 4/1971 | Sands et al. | 423/448 |
| 3,639,266 | 2/1972 | Battista | 252/421 |

*Primary Examiner*—Edward J. Meros
*Attorney, Agent, or Firm*—Dean E. Carlson; Dupley W. King; Ignacio Resendez

[57] ABSTRACT

High temperature insulating bodies are made by granulating cork, compressing and heating to bind and cure the cork granules, and thereafter carbonizing the bound and cured granules. The carbonized material, if desired, may be graphitized.

9 Claims, 4 Drawing Figures

TKD CELL STRUCTURE 600X

HIGH TEMPERATURE INSULATING CARBONACEOUS MATERIAL

BACKGROUND OF INVENTION

The invention relates to a process for making a high temperature insulating material and the product formed therewith.

Fibrous carbon, carbon foams and graphite made from wood, polyurethane foams and other like starting materials have been used in the prior art for their thermal insulation properties. Items made from these materials have included such as ablative material on reentry vehicles, brake linings, thermal insulators and the like. Although these products have been useful, their thermal conductivities increase rapidly with increasing temperatures in excess of about 2000°C such as to limit the applications or usefulness of these material at such temperatures. As an example, the outer surfaces of vehicles reentering the earth's atmosphere can reach temperatures in excess of 3870°C. The internal components of these vehicles must be protected by an additional layer of insulation at the inner suface of the exterior heat shield. The outer surface of the insulation must be compatible with the heat shield and, at the same time, be able to withstand essentially the same temperatures as the heat shield. For space applications, it is preferred that the insulation material be lightweight and have a low thermal conductivity over the operating temperature range.

Fibrous felts and open-celled foams are the two types of carbon and graphite insulation primarily being used as stated above. Although these have low thermal conductivity at low temperatures, the conductivity increases rapidly with increase in temperature such that above 2500°C, the conductivity increase may be proportional to the third power of temperature. This results from the fact that the long radiation paths in these materials permit heat to be transferred by radiation at high temperatures. High density foams have large effective cross sections for conduction and have high conductivity at all temperatures. Although felts have a lower conductivity at lower temperatures, their compressive strengths are very low. With foams, however, the static compressive strengths are higher but vibration loads crumble the surfaces.

These drawbacks, such as high thermal conductivity at temperatures above about 2500°C, low compressive strengths, low vibration resistance, and the like are overcome by this invention.

SUMMARY OF INVENTION

In view of the above, it is an object of this invention to provide a high temperature insulating material made from cork which has improved thermal insulation properties at temperatures above about 2000°C.

It is a further object of this invention to provide a method for forming a high temperature insulating material which has improved compressive and tensile strengths.

It is a further object of this invention to provide a method for forming a high temperature insulating material which is resistant to vibration loads.

It is a further object of this invention to provide a method for increasing the tensile and compressive strengths of this high temperature insulating material.

It is a further object of this invention to provide a high temperature insulating material which may be used for load-bearing insulation such as behind carbon or graphite ablation shields on reentry vehicle bodies.

Various other objects and advantages will appear from the following description and the most novel features will be particularly pointed out hereinafter in connection with the appended claims. It will be understood that various changes in the details and materials as well as the process steps which are herein described and illustrated in order to explain the nature of this invention may be made by those skilled in the art without departing from the scope of this invention.

The invention comprises providing high temperature insulating material having improved thermal insulation and strength properties by comminuting cork material, compressing and heating the comminuted granules, carbonizing the bound and compressed granules, and, subsequently, if desired, graphitizing the carbonized material.

DETAILED DESCRIPTION

Figure 1:
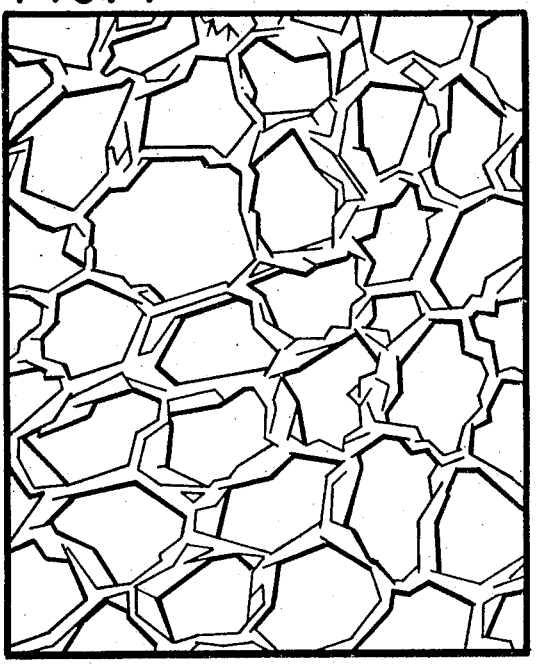
FIG. 1 is a representation of an electron photomicrograph magnified 600 times illustrating the cell structure of cork.

This invention uses natural cork which is the bark of the cork oak, *Quercus Suber*. In performing this invention, cork which has had its impurities removed through processes old in the art, is comminuted to a granule size of from between about 150 and 2000 micron diameters and preferably between about 300 and about 1200 micron diameters. The comminuting process and granule size achieved serve the purpose of substantially eliminating voids or structural deficiencies which may have been inherent in the original or natural cork slab. The comminuted particles or cork granules may thereafter be molded or shaped by placing in a mold made of a suitable material such as stainless steel, aluminum, or other metal. This mold or confining means may generally be in the shape of the final product, or may approximate the same so that minimal amount of machining of the finished product may be required. The comminuted granules or particles so confined or molded may be compressed if required to achieve a given density. The pressure used will be dependent upon the density desired. The material will expand during heating due to thermal expansion creating thereby an internal pressure so that external compaction may not be necessary. The mold containing the cork particles, which may be compressed or slightly packed, is then heated to a temperature of between about 260°C and about 310°C for a length of time suitable to satisfactorily cure and bind the cork granules. This temperature is used because it effects flow of the lignin naturally found in cork which acts as a binder. Times which may be necessary are dependent upon the quantity of granules involved, mold size, material thickness, etc. Times which have been generally found to be satisfactory at the recited temperature range are from abut 4 to about 6 hours. Heat and compression effectively bind and cure the granules.

Use is made of the natural binder material (lignin) of cork as recited above in the curing step so that an additional additive or adhesive or binder is not required. If it is desired to increase the strength of the final product, a suitable carbonizable adhesive may be added to the granules prior to application of heat and pressure. This effectively increases the strength of materials and reduces grain boundary failure at given loads. Suitable adhesives or binders which have been used are such as refined coal tar pitch, furane resins, lignin, phenolic resins, and epoxides. It should be understood that heating primarily expedites curing times and that if a suitable binder and adequate pressure were maintained for a sufficient length of time, no heating or only a minimal amount would be required.

Generally the amount of binder that may be added is from about 10% to about 25% by weight depending upon the binder composition and properties. The characteristics for the binder should be:

1. A high carbon yield during carbonization to produce a strong composite with minimum voids.
2. A low viscosity resin to minimize the amount of binder needed.
3. Good wetting of the cork by the resin to obtain a good bond between the cork and binder to strengthen the composite.

FIG. 1 is a representation of an electron photomicrograph at 600 magnification of a cork material which illustrates the cell structure of cork. The photomicrograph was taken of a sample that did not have a binder additive other than the natural lignin found in the cork, and that had been heated and slightly compressed to a density of about 9.6 pounds per cubic foot ($lb/ft^3$). As noted, the application of pressure should be minimal so as to minimize distortion of the cells. Cork is made up entirely of 14 sided (i.e., tetrakaidecahedronal hereinafter referred to as TKD) closed cells averaging approximately 0.001 inches in diameter. FIG. 1 also shows that the cmpression force exerted was in a direction from top left to bottom right. It should be noted that the density, composition, and fibrous structure of wood is so different than that of cork that wood cannot be used in this invention.

Figure 2:
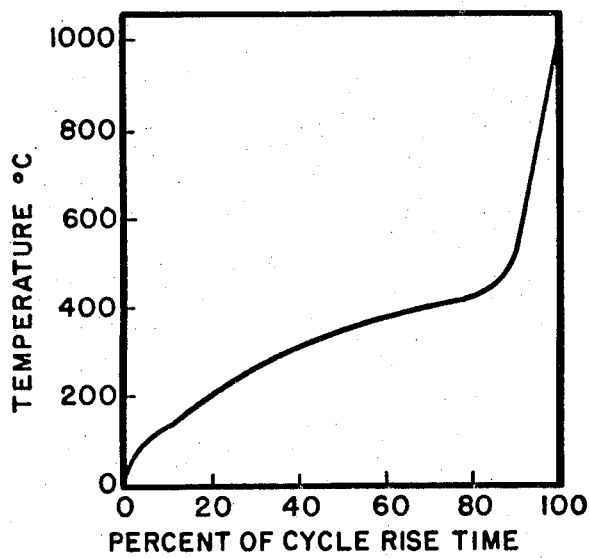
FIG. 2 illustrates a typical carbonization cycle for carbonizing cork.

After curing and binding of the cork granules, these are carbonized by a suitable carbonizing cycle, such as illustrated in FIG. 2, in an inert atmosphere such as argon or helium. As used herein, carbonizing cycle refers to the period required to bring the granules to a carbonizing temperature of from about 900°C to about 1200°C. Typical carbonizing cycles will be dependent primarily upon the thickness of the cork. Cork has been successfully carbonized by heating it to a temperature of between about 900° and about 1200°C for a cycle period of from about 30 to about 100 hours. A thin cork material, such as of one inch thickness, will required minimum cycle time, such as about 30 hours, whereas a thick material, such as of 5 inch thickness, will require long cycle times such as about 100 hours in order to achieve uniform temperature within the material, removal of entrapped gases, uniform expansion of cork structure, etc. and thus avoid cracking of the cork. Heat input should be gradually increased in a manner as shown in FIG. 2 which illustrates temperature versus percent of cycle rise time in an ideal carbonizing cycle. Thus a carbonizing cycle that attains or incorporates a temperature sequence in relation to a cycle rise time, such as: heating to not more than about 240°C, and preferably to between about 200°C and about 240°C, at about 20% of cycle rise time, then to not more than about 340°C, and preferably to between about 300°C and about 340°C, at about 40 percent cycle rise time, then to not more than about 400°C, and preferably to between about 360°C and about 400°C, at about 60 percent of cycle rise time, then to not more than about 430°C, and preferably to between about 390°C and about 430°C, at about 80 percent of cycle rise time, then to not more than about 1200°C, and peferably to between about 900°C and about 1200°C at about 100 percent cycle rise time, and then holding at the temperature reached of between 900°C and 1200°C for from about 4 to 1 to about 5 hours at the completion of the cycle rise time, may be preferred. At any event, 1 to 5 hour hold at about 1000°C at the end of the cycle is preferred to obtain uniform properties. The density and other properties of the material are determined by many factors such as the degree of compression, particle size of the granules, the amount of adhesive or binder used, etc. Materials having densities of from about 5 to about 30 $lb/ft^3$ have been carbonized using this process.

Figure 3:
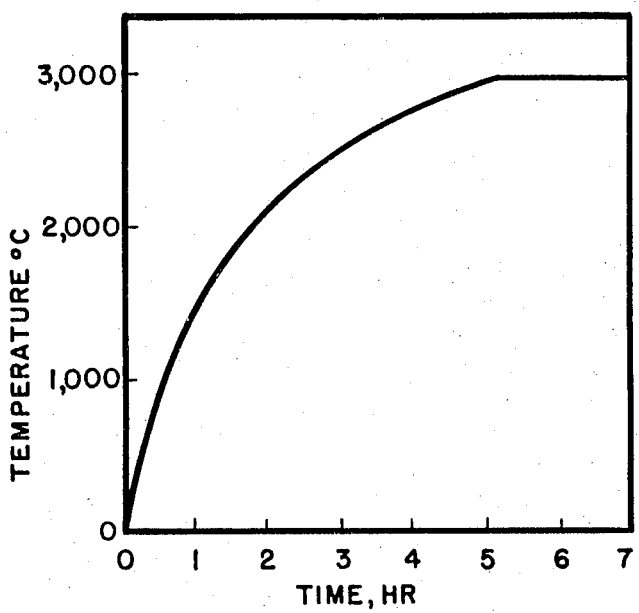
FIG. 3 illustrates a typical graphitization cycle for graphitizing carbonized cork.

The carbonized cork material may be graphitized, after cooling to ambient temperature or directly from the maximum temperature of the carbonzation cycle, at a suitable temperature of from about 2800°C to about 3000°C in a vacuum or an inert atmosphere such as argon or helium. An ideal curve for graphitizing the carbonized material of this invention is shown in FIG. 3.

Thus a graphitizing cycle that attains or incorporates an increasing temperature sequence in relation to time, such as: heating to between about 1300°C and about 1700°C after 1 hour heating period, and then to between about 2000°C and abut 2400°C after 2 hours of heating, and then to between about 2400°C and about 2800°C after 3 hours of heating, and subsequently heating to the graphitizing temperature of between about 2800°C and about 3000°C and holding this temperature for from about 1 to about 4 hours may be preferred. The temperature of about 3000°C is preferably attained by gradual heating as described above, that is, increasing the temperature incrementally to approximate the curve of FIG. 3, and is then maintained at about 3000°C for about 1 to 4 hours to achieve best results. The graphitized cork material of this invention has several different material properties than the carbonized cork material. These include:

1. A higher electrical conductivity.
2. A higher thermal conductivity at low temperatures resulting in less conductivity variation with temperature.
3. A lower coefficient of thermal expansion.
4. Greater oxidation resistance.
5. Lower compressive, flexure, and tensile srength.
6. Lower modulus of elasticity.
7. High impact strength.

The material of this invention, TKD, may be used to insulate heat sources in radioisotopic thermoelectric generators used in the space programs. The fact that the conductivity of graphite TKD does not increase with temperature may be more important for this application than the low value of conductivity. Graphite TKD is strong enough to support the heat source in the generator and resilient enough to compensate for thermal expansion.

Other applications of the material of this invention which make use of the properties to be described hereinafter are such as:
1. Load bearing insulation behind carbon or graphite ablation shields on reentry vehicles.
2. Insulator/ablator for low flux areas of reentry vehicles.
3. Insulator for planetary probes where temperatures exceed 2500°C.
4. High temperature insulation on any apparatus in a vacuum, inert atmosphere, or restricted atmosphere.

Heat is transferred through insulation by solid conduction, gas conduction, radiation, and, in some very loose fibers or large cell foams, by gas conduction. For a given structure and solid material, solid conduction is proportional to the density of the insulation. For a given density, gas conduction is nearly constant unless pressures are low or the cells are very small. Radiation is proportional to the fourth power of temperature and inversely proportional to the number of radiation shields (that is, cell walls per unit thickness). The cork structure thermal insulator which has been carbonized may have a TKD cell diameter of about 0.0007 inch. After graphitization the TKD cell diameter may be about 0.0006 inch.

At temperatures above about 2000°C, most other insulators transfer most of the heat by radiation. However, the cell size of TKD is sufficiently small that almost no heat is transferred by radiation. Further, the small cell size of TKD also reduces the gas conduction within the cells. The effective conductivity of TKD is nearly proportional to the conductivity of the solid material over the entire useful temperature range. The high strength of TKD is a result of the cell structure. The flat cell sides reduce bending moments resulting in pure tension or compression loading and the uniform wall thickness eliminates weak areas.

Tensile strength of TKD may be improved by adding fibers to the composites. The fibers must carbonize and graphitize and, further, must shrink in essentially the same proportions as the cork structure during these processes. Cellulose acetate (rayon) meets these requirements. The fibers mechanically key to the cork granules as well as bond to them. The fibers should be of small diameter such as less than about 0.001 inches and about ¼ inch long. The addition of from about 1 to about 5 percent by volume may be used effectively.

Figure 4:
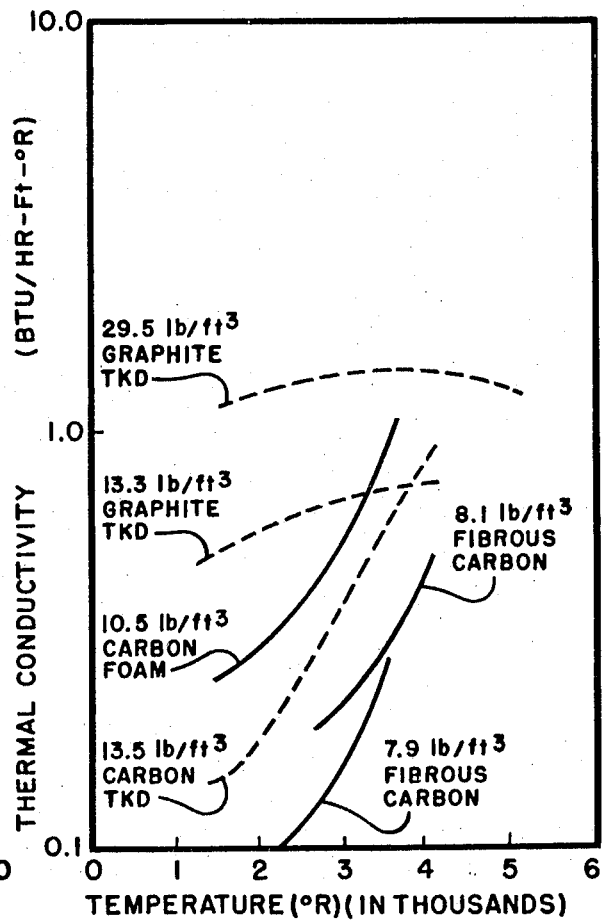
FIG. 4 illustrates comparative thermal conductivity curves for the material of this invention as well as carbon foam and fibrous carbon.

Thermal conductivity data for several densities of TKD graphite and carbon are shown in FIG. 4. The carbon foam and fibrous carbon used in the graph and in Table I are the materials which would most closely approximate the TKD structure of this invention. Thermal conductivity is proportional to the conductivity of the solid and the density of insulation according to theory. FIG. 4 shows the carbon TKD has a lower conductivity than carbon foam for all temperatures. The conductivity at low temperatures would be about the same as the fibrous carbon of the same density. At temperatures above 4000°R the conductivity of the other insulators is increasing proportional to the temperature cubed, but the rate of increase for carbon TKD is decreasing. The conductivity of graphite TKD is nearly constant and it actually drops at high temperatures as shown in FIG. 4. These results enable the use of this invention as high temperature insulating material.

Table I compares the strength of TKD with other high temperature insulators. The strength of carbon TKD is about the same as the higher conductivity foams and is much stronger and more rigid than the fibrous carbons.

| Material | Density (lb/ft³) | Crush Stress (psi) | Stress at 10% Deflection (psi) | Stress at 20% Deflection (psi) | Modulus of Elasticity | % Compression to crush |
|---|---|---|---|---|---|---|
| Graphite TKD | 17.5 | 596 | — | — | 45,000 | 1.32 |
| Carbon TKD | 13.5 | 960 | — | — | 107,600 | .89 |
| Carbon Foam | 12.5 | 876 | — | — | 71,300 | .81 |
| Fibrous Foam | 8.2 | — | 24 | 35 | 384 | — |
| Fibrous Carbon | 14.9 | — | 171 | 245 | 3,610 | — |

With regard to tensile strengths, carbon foam at a density of 12.5 lbs/cubic ft has a tensile strength of 230 lbs/sq inch. Carbon TKD at a density of 13.5 lbs/cubic ft has a tensile strength of 238 lbs/sq inch which is comparable to carbon foam. Carbon TKD with 1.2 percent fibers (cellulose acetate) at a density of 13.3 lbs/cubic ft has a tensile strength of 281 lbs/sq inch. Thus the addition of this relatively small amount of fibers has increased the tensile strength by about 18 percent.

What is claimed is:
1. A process for manufacturing thermal insulating carbonaceous material for use at temperatures in excess of 2000°C comprising; comminuting natural tetrakaidecahedronal cell structure cork to from about 150 microns to about 2000 microns diameter granules, confining said granules, heating said granules while so confined to interbind and cure said granules into a shaped form, heating said shaped form to a temperature of from about 900°C to about 1200°C in from about 30 to about 100 hours to carbonize said shaped form to a high temperature insulative material, and holding at said temperature for a period of from about 1 to about 5 hours.

2. The process of claim 1 wherein said carbonizing heating comprises heating to not more than about 240°C at about 20 percent of cycle rise time, to not more than about 340°C at about 40 percent cycle rise time, to not more than about 400°C at about 60 percent of cycle rise time, to not more than about 430°C at about 80 percent of cycle rise time, and then to between about 900°C and 1200°C at about 100 percent cycle rise time.

3. The process of claim 1 including the step of further heating said carbonized form to a graphitizing temperature of from about 2800°C to about 3000°C in a vacuum or inert gas atmosphere to graphitize said carbonized form and maintaining said graphitizing temperature for from about 1 to about 4 hours.

4. The process of claim 1 including confining with said granules cellulose acetate fibers having a diameter of about less than 0.001 inch and a length of about 0.25 inch, said fibers comprising from about 1 percent to about 5 percent of the total volume of said granules.

5. The process of claim 1 including the additional step of adding, prior to said interbinding and curing heating, a carbonizable binder taken from the group consisting of phenolic resins, epoxides, furane resins, lignin, and refined coal tar pitch.

6. The process of claim 1 including confining said granules under pressure during said heating to achieve a desired material density.

7. The process of claim 1 wherein said heating of said confined granules is from about 260°C to about 310°C for from about 4 to about 6 hours.

8. A thermal insulating carbonaceous form for use at temperatures in excess of 2000°C consisting essentially of carbonized cork havng tetrakaidecahedronal cells structure, density of from about 5 to about 30 pounds per cubic foot, and cell diameters of about 0.0007 inch produced by the process of claim 1.

9. A thermal insulating graphite form for use at temperatures in excess of 2000°C having tetrakaidecahedronal cells structure, a density of from about 5 to about 30 pounds per cubic foot, and cell diameters of about 0.0006 inch produced by the process of claim 3.

* * * * *